United States Patent [19]
Colley et al.

[11] Patent Number: 6,012,639
[45] Date of Patent: Jan. 11, 2000

[54] EDGE DETECTION METHOD AND APPARATUS FOR SHOT NOISE LIMITED SIGNALS

[75] Inventors: James E. Colley; Bryan L. Olmstead, both of Eugene, Oreg.

[73] Assignee: PSC Scanning Inc., Eugene, Oreg.

[21] Appl. No.: 08/961,720

[22] Filed: Oct. 31, 1997

Related U.S. Application Data

[60] Provisional application No. 60/030,114, Nov. 1, 1996.

[51] Int. Cl.$^7$ ....................................... G06K 7/10
[52] U.S. Cl. ........................................ 235/462.16
[58] Field of Search .................... 235/462.16, 462.17, 235/462.18, 462.19

[56] References Cited

U.S. PATENT DOCUMENTS

| | | |
|---|---|---|
| 4,000,397 | 12/1976 | Hebert et al. . |
| 5,103,080 | 4/1992 | Barkan . |
| 5,210,397 | 5/1993 | Eastman . |
| 5,294,783 | 3/1994 | Hammond, Jr. et al. ............... 235/462 |
| 5,329,105 | 7/1994 | Klancnik et al. ......................... 235/463 |
| 5,389,770 | 2/1995 | Ackley ..................................... 235/462 |
| 5,436,440 | 7/1995 | Barkan . |
| 5,504,318 | 4/1996 | Joseph et al. . |
| 5,519,199 | 5/1996 | Watanabe et al. ....................... 235/463 |

*Primary Examiner*—F. L. Evans
*Attorney, Agent, or Firm*—Lyon & Lyon LLP

[57] ABSTRACT

A method and apparatus for improving the accuracy of bar and space measurements in a barcode scanner system utilizing second derivative signal processing is provided wherein edges are more accurately detected under low signal-to-noise conditions, such as when shot noise is the major source of noise in an input signal and the larger noise levels present during the light portions of the input signal may cause premature triggering of a light-to-dark transition in the output signal. In a preferred embodiment, an input capture circuit captures and stores the time of successive assertions of an STV signal corresponding to light-to-dark transitions. Upon detection by a second input capture circuit of a first assertion, following the STV assertions, of an RTV signal corresponding to dark-to-light transitions, the last STV signal time is stored and used with a previously stored RTV time to determine a space width. The new RTV signal time and the last STV signal time are then used to determine a bar width. Thus, light-to-dark transitions in the output signal are triggered on the last second derivative zero crossing which occurs within a comparator gate instead of the first zero crossing. Subsequent assertions of an RTV signal are preferably ignored until after one or more additional STV signal assertions occur. The entire process repeats for each light and dark position until the entire signal has been processed.

17 Claims, 3 Drawing Sheets

EDGE DETECTION METHOD AND APPARATUS FOR SHOT NOISE LIMITED SIGNALS

RELATED APPLICATION

This application claims the benefit of U.S. Provisional Application No. 60/030,114, filed Nov. 1, 1996.

FIELD OF THE INVENTION

The field of the present invention relates to data readers, such as scanners and barcode reading devices. In particular, barcode readers are described herein which employ methods and apparatus for improved edge detection for more accurately measuring bar and space widths under low signal-to-noise ratio conditions.

BACKGROUND

A barcode label comprises a series of parallel dark bars of varying widths with intervening light spaces, also of varying widths. The information encoded in the barcode is represented by the specific sequence of bar and space widths, the precise nature of this representation depending on the particular barcode symbology in use.

Barcode reading methods typically comprise the generation of an electronic signal wherein signal voltage alternates between two preset voltage levels, one representative of the dark bars and the other representative of the light spaces. The temporal widths of these alternating pulses of high and low voltage levels correspond to the spatial widths of the bars and spaces. The temporal sequence of alternating voltage pulses of varying widths comprising the electronic signal is presented to an electronic decoding apparatus for decoding of the information encoded in the barcode.

A variety of common and well developed methods exist for generating the electronic signal by converting the spatial bar/space sequences into temporal high/low voltage sequences, i.e., barcode reading. Common types of barcode readers include spot scanners and line scanners.

Spot scanners comprise barcode reading systems wherein a source of illumination, the reading spot, is moved (i.e., scanned) across the barcode while a photodetector monitors the reflected or backscattered light. In one type of spot scanner system, typically referred to as a wand reader, the reading spot of the scanner is manually moved across the barcode. In another type of spot scanner system the reading spot of the scanner is automatically moved across the barcode in a controlled pattern. In any of the spot scanner systems, the path followed by the scanned illumination beam is typically referred to as a scan line.

The illumination source in spot scanners is typically a coherent light source (such as a laser), but may comprise a non-coherent light source (such as a light emitting diode). A laser illumination source, however, offers the advantage of high intensity illumination over a small area which may allow barcodes to be read over a large range of distances from the barcode scanner (large depth of field) and under a wide range of background illumination conditions. The photodetector associated with spot scanners may generate a high current when a large amount of light scattered from the barcode impinges on the detector, as from a light space, and likewise may produce a lower current when a small amount of light scattered from the barcode impinges on the photodetector, as from a dark bar.

In automatic spot scanning systems, a scanning mechanism, or scan engine, is utilized to automatically scan the illumination beam across the barcode. Such scanning mechanism may comprise a rotating mirror facet wheel, a dithering mirror, or other means for repetitively moving the illumination beam.

In addition to a scan engine, a barcode scanner may also employ a set of scan pattern generating optics to produce a multiplicity of scan lines in various directions from the scanner and at varying orientations, thereby allowing barcodes to be read over a large angular field of view and over a wide range of orientations (i.e., a multi-dimensional scan pattern). The scan pattern generating optics typically comprise a set of mirrors aligned at varying angles, each of which intercepts the illumination beam during a portion of its motion and projects it into the region in front of the barcode scanner, hereinafter referred to as the scan volume. Each mirror in the set, in conjunction with the scan engine, produces a scan line at a particular position and at a particular orientation.

Early prior art spot scanner systems depended upon individual scan lines extending across the entire barcode for the barcode to be successfully read. These systems presented difficulties and inefficiencies in real-time, practical applications wherein the orientation of a barcode vis-a-vis the scanner was hard to control. Accordingly, specialized piecing mechanisms, comprising software or electronics, have been developed that are capable of taking partial portions of barcodes and assembling them into a complete code, a process commonly known as stitching. Further details regarding exemplary stitching methods and systems may be found in U.S. Pat. No. 5,493,108, entitled "Method and Apparatus for Recognizing and Assembling Optical Code Labels" and issued in the name of inventors Craig D. Cherry and Donald D. Dieball, which patent is owned by the owner of the present application and is hereby incorporated by reference as if fully set forth herein.

With respect to line scanner systems, an entire barcode is focused onto a multi-element linear or areal photodetector array and the image of the barcode is detected. The photodetector array may comprise a CCD array (charge coupled device), a CMOS active or passive pixel sensor array, or other multi-element photodetector array. This type of reader may also include a light source to illuminate the barcode to provide the required signal response corresponding to the image. The imaging optics which produce an image of the barcode on the photodetector array can alternatively be thought of as projecting an image of the photodetector array (a "virtual scan line") into the scan volume in a manner completely analogous to the real scan line produced by a spot scanner. Further, scan pattern generating optics may be used to project multiple virtual scan lines into the scan volume in various directions and at varying orientations, thereby generating a virtual scan pattern, once again completely analogous to the real scan pattern produced by a spot scanner. Virtual scan pattern systems are further described in U.S. Pat. No. 5,446,271, entitled "Omnidirectional Scanning Method and Apparatus" and issued in the name of inventors Craig D. Cherry and Robert J. Actis, which patent is owned by the owner of the present application and is hereby incorporated by reference as if fully set forth herein.

Regardless of which of the barcode readers described in the preceding paragraphs is used, a raw electronic signal is generated from which the relative widths of the bars and spaces must be extracted. High-to-low or low-to-high transitions (i.e., edges) in the electronic signal voltage may be detected by any of a number of means well known in the art. A common and well known technique for edge detection is second derivative signal processing, wherein zero crossings of the second derivative of the electronic signal are found during selected timing intervals. An example of this technique is described in U.S. Pat. No. 4,000,397 entitled "Signal Processor Method and Apparatus" issued in the name of Hebert et al. and owned by the owner of the present application, which patent is hereby incorporated by reference as if fully set forth herein.

The accuracy of the relative bar and space widths rendered from the raw input signal by derivative signal processing techniques is often significantly degraded by noise in the input signal. One large source of noise in the input signal is often shot noise, which varies directly with the intensity of the light being detected. The shot noise level is therefore typically higher during the space portions of the input signal, since higher light intensity is incident on the detector from the space portion of the barcode. If the overall signal level is large enough, the shot noise, which typically varies as the square root of the signal level, becomes negligible (i.e., the signal-to-noise ratio becomes large) and does not degrade the accuracy of the relative bar and space widths produced by the signal processor. Under low signal conditions, however, the instant inventors have identified that the shot noise can become quite significant, leading to a small signal-to-noise ratio and significant degradation of the accuracy of the widths produced by the signal processor.

Low signal conditions may arise under a variety of circumstances. In a spot scanner, the strength of the signal depends directly on the intensity of the illumination source and the efficiency of the signal collection optics. In line scanners the intensity of the illumination source and efficiency of the collection optics also determine the signal level. The signal level is particularly low in line scanners utilizing only ambient illumination. In either type of scanner, positioning the barcode out of the optimum depth of field of the scanner results in blurring of the input signal. The overall signal levels may not decrease very much, but the transitions in the input signal are "softer" (i.e., more gradual), leading to smaller peaks and smaller signal-to-noise ratio in the derivative signals. Relative tilt between a barcode and a line scanner with rectangular detector elements leads to input signals similar to those produced by blurring.

It has been suggested that these and other low signal conditions may be improved in existing scanners in a variety of ways, including but not limited to: using higher power illumination sources; enlarging the depth of field of the scanner; and/or using square detector elements in a multi-element detector array. However, these solutions may undesirably result in, inter alia, increased size, power consumption, complexity, and/or cost of the barcode scanner in question, and/or in degradation of one or more of the performance parameters or characteristics of the barcode scanner.

SUMMARY OF THE INVENTION

The present invention relates to methods and apparatus for improving the accuracy of edge detection using second derivative signal processors. In a preferred embodiment, light-to-dark transitions in the output signal are triggered on the last second derivative zero crossing which occurs within a comparator gate instead of the first zero crossing (i.e., "last STV, first RTV"), thereby producing a more accurate output signal, particularly when shot noise is the major source of noise in the input signal and the larger noise levels present during the light portions of the input signal may otherwise cause premature triggering of a light-to-dark transition in the signal processor output signal.

A preferred embodiment comprises a method for more accurately detecting edges in barcode scanner video signals and hardware and/or software for implementing said method. An input capture circuit captures and stores the time of successive assertions of the STV signal, corresponding to a light-to-dark transition. Upon detection by a second input capture circuit of a first assertion of RTV (corresponding to a dark-to-light transition) following the STV assertions, the last STV time is stored and used with a previously stored RTV time to determine a space width. The new RTV time is stored and it and the last STV time are used to determine a bar width. Subsequent assertions of RTV are preferably ignored until after one or more additional STV assertions occur. The entire sequence is repeated for each light and dark portion of the input signal until the entire signal has been processed.

The preferred embodiments herein may advantageously offer more accurate rendering of relative bar and space widths under low signal-to-noise ratio conditions, thus allowing the barcode scanner to be used under a wider range of conditions. As well, the preferred embodiments may be implemented with minimal additional cost, components, or power consumption, and may result in a signal processor which is more tolerant of low signal levels, thus other performance characteristics of the scanner may be relaxed resulting in improved performance parameters and/or reductions in size, cost, complexity, and power consumption. Such advantages allowed by greater noise tolerance of the signal processor include but are not limited to: reduction of intensity of the illumination source, or elimination of the illumination source altogether; use of the scanner over a larger depth of field; operation over a wider range of ambient illumination conditions; use of lower threshold levels in the signal processor to allow detection of lower level signals; operation over a wider range of relative tilt between the scanner and barcode; and reduction of the required efficiency of the optical collection and/or imaging system. Further advantages and related objects will be apparent to those skilled in the art from a review of the detailed description in conjunction with the accompanying drawings.

DETAILED DESCRIPTION OF THE PREFERRED EMBODIMENTS

Figure 1:
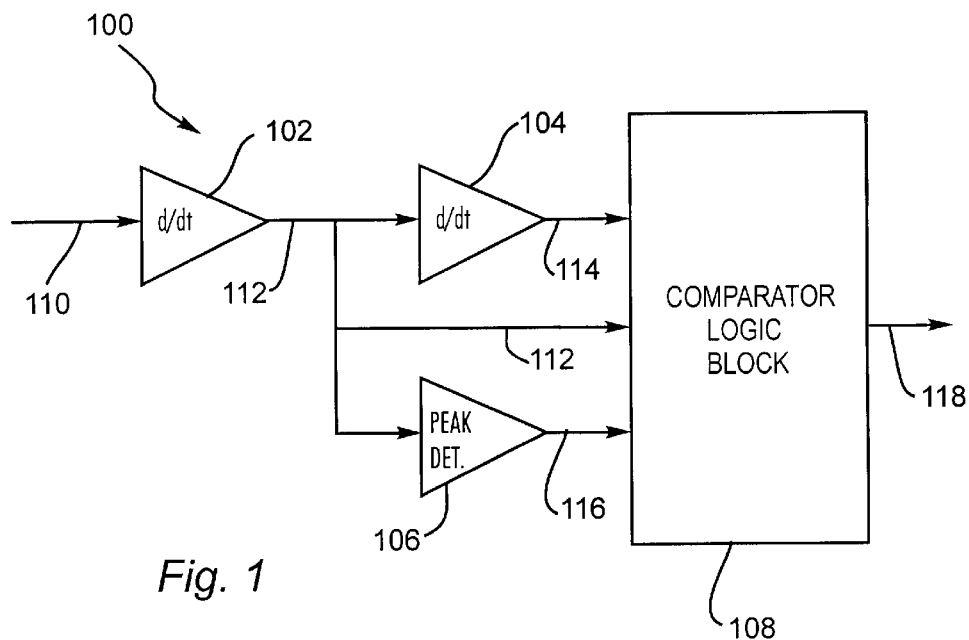
FIG. 1 is a schematic block diagram of a known second derivative signal processor.
Figure 2:
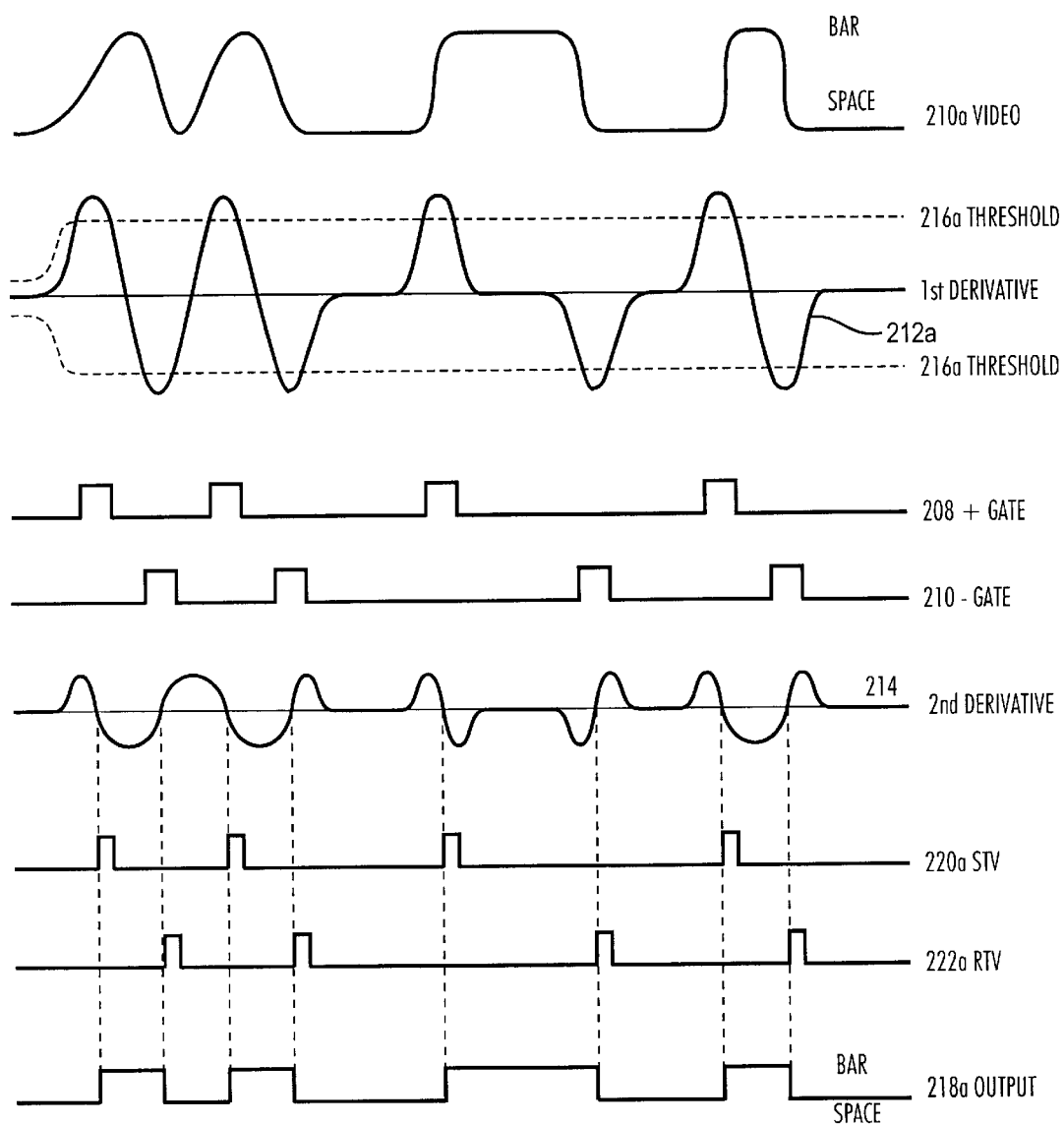
FIG. 2 is a graph illustrating waveforms, in the absence of noise, of the signals associated with the known signal processor of FIG. 1.

An example of a known second-derivative signal processing circuit 100 is illustrated in block diagram form in FIG. 1. Corresponding waveforms for the signals associated with the circuit in FIG. 1 are illustrated in FIG. 2. Like numeric references are used for like elements throughout the various drawings.

The circuit of FIG. 1 comprises: a first differentiator 102; a second differentiator 104; a peak detector 106; and a comparator logic block 108. In the present example, increasing incident light intensity on the detector (e.g., photodetector(s)) corresponds to decreasing voltage in the input signal 210a (FIG. 2); however, completely analogous waveforms could be generated with an input signal of the opposite polarity. With reference to both FIGS. 1 and 2, the first differentiator 102 takes the time derivative of the input signal 210a on input line 110 and thereby produces a first derivative signal 212a on its output line 112. The second differentiator 104 takes the time derivative of the first derivative signal 212a and thereby produces a second derivative signal 214 on its output line 114. The first derivative signal 212a is coupled to a peak detector circuit 106, which may comprise either a single full-wave detector or a pair of peak detectors (one positive and one negative), and which detects the peak value of the first derivative signal 212a and thereby generates threshold signals 216a, attenuated versions of the peak value, on its output line 116. It should be noted that the threshold signals 216a decay to levels offset from the baseline in the absence of incoming data to keep baseline noise from propagating to the output.

The threshold signals 216a, first derivative signal 212a, and second derivative signal 214 are provided to a comparator logic block 108. The comparator logic block 108 generates both positive and negative comparator gate signals, 208 and 210, respectively, corresponding to positive and negative peaks of the first derivative signal 212a, respectively, which are asserted when the first derivative signal 212a exceeds the threshold signals 216a, either positively 208 or negatively 210. The comparator logic block 108 also detects zero crossings of the second derivative signal 214 by comparing the second derivative signal 214 with a zero or reference voltage level. The zero crossings of the second derivative signal 214 are considered valid transitions if they occur while the appropriate comparator gate signal 208 or 210 is asserted. If such a valid transition is detected while the positive comparator gate signal 208 is asserted, an STV ("set video") signal 220a is asserted while the positive comparator gate signal 208 continues to be asserted, thereby triggering a transition in the signal processor output signal 218a on the output line 118 of the comparator logic block 108 from a SPACE signal level to a BAR signal level (a light-to-dark transition). If a valid transition is detected while the negative comparator gate signal 210 is asserted, an RTV ("reset video") signal 222a is asserted while the negative comparator gate signal 210 continues to be asserted, thereby triggering a transition in the signal processor output signal 218a from a BAR signal level to a SPACE signal level (a dark-to-light transition). An example signal processor output signal 218a, comprising a reconstructed barcode signal which may be presented to a decoder for decoding, is represented in FIG. 2.

Note that in the signal processor 100, as depicted in the example above, the transitions in the signal processor output signal 218a are only triggered by the first assertion of the STV signal 220a or RTV signal 222a after the assertion of the other, and that subsequent assertions of either signal after it has been asserted once are ignored until after the other signal has been asserted. In other words, only the first assertion of an RTV signal 222a after an assertion of an STV signal 220a triggers a BAR to SPACE transition, and only the first assertion of an STV signal 220a after an assertion of an RTV signal 222a triggers a SPACE to BAR transition (i.e., "first STV, first RTV").

Further details regarding second derivative detection techniques are described in U.S. Pat. No. 4,000,397, cited above. In addition, further details regarding design and construction of electronic filters for use as differentiators may be found in *Electronic Filter Design Handbook* by Arthur B. Williams (McGraw Hill, 1981), which text is incorporated by reference as if fully set forth herein.

Transitions in the input signal may also be detected by use of techniques described in U.S. Pat. No. 5,463,211, entitled "Delay-Line Based Signal Processing Method and Apparatus" and issued in the name of inventors Thomas C. Arends and Randy D. Elliott, and in U.S. Pat. No. 5,371,361, entitled "Optical Processing System" and issued in the name of inventors James E. Colley, Thomas C. Arends, Blaine F. Loris, Donald S. Peterson, James W. Ring, and Matt D. Schler, both of which patents are owned by the owner of the present application and are hereby incorporated by reference as if fully set forth herein. Further related techniques may be found in U.S. Pat. No. 5,298,728, entitled "Signal Processing Apparatus and Method" and issued in the name of inventors Randy D. Elliott and Blaine F. Loris, which patent is also owned by the owner of the present application and is hereby incorporated by reference as if fully set forth herein.

The signal processor output signal 218a comprising a reconstructed barcode signal is presented to a decoder which interprets the transition data by means well known in the art. Thus, the decoder may determine the relative widths of bars and spaces by measuring the relative time between each transition in the signal processor output signal 218a. The decoder may use the bar and space measurement data to determine which of a variety of barcode symbologies have been scanned, and/or the particular characters encoded within the barcode. Further details regarding decoding may be found, for example, in U.S. Pat. No. 5,493,108, which patent was previously cited hereinabove.

Figure 3:
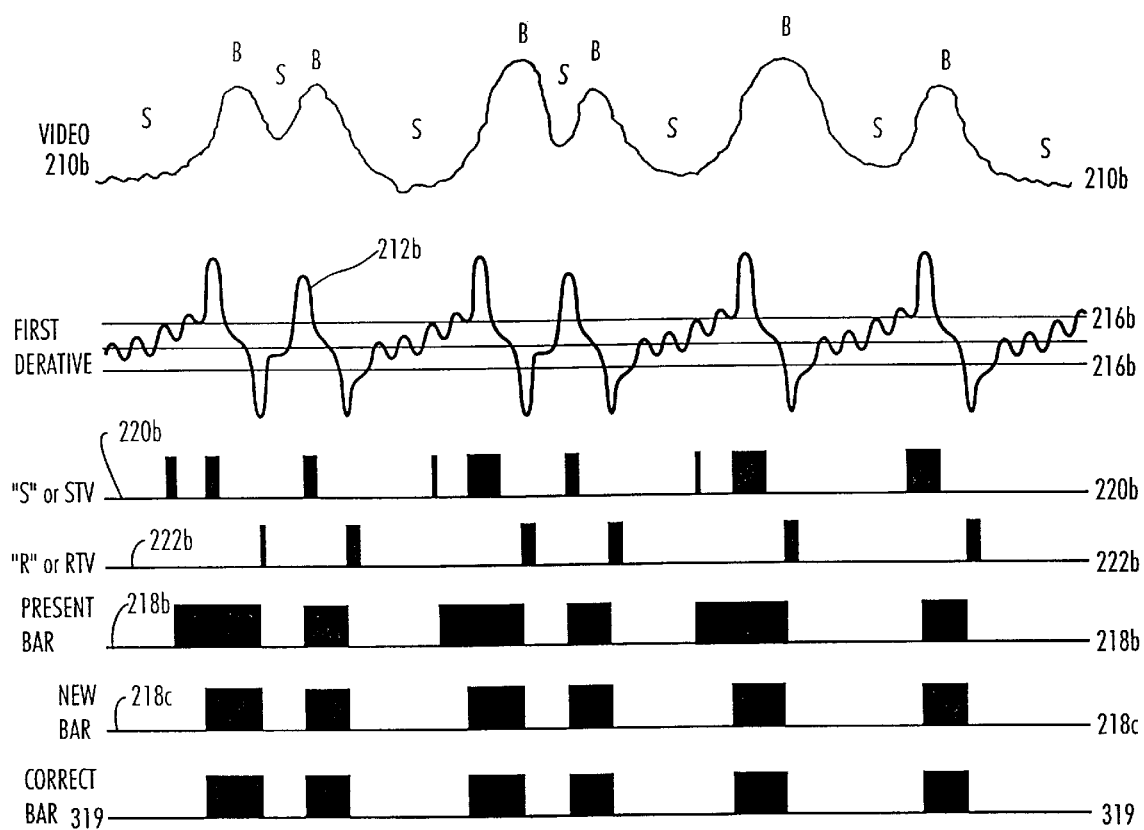
FIG. 3 is a graph illustrating corresponding waveforms, in the presence of noise, to those of FIG. 2, wherein output signals in accordance with the known signal processor of FIG. 1 are compared to output signals in accordance with a preferred embodiment of the present invention; and, FIG. 4 is a schematic block diagram of a second derivative signal processor in accordance with a preferred embodiment of the present invention.

As noted previously, the instant inventors have found that, under low signal conditions, shot noise can become quite significant, leading to a small signal-to-noise ratio and significant degradation of the accuracy of the widths produced by the signal processor. FIG. 3 illustrates waveforms analogous to those of FIG. 2, but under conditions of low signal-to-noise ratio. Note that the relative signal-to-noise ratio decreases upon differentiation of the input signal 210b, as is generally the case for derivative circuits. Inaccuracies in the timing of light/dark transitions occur when the noise peaks in the first derivative signal 212b are large enough and/or the threshold signals 216b are low enough that the noise peaks in the first derivative signal 212b trigger assertions of the comparator gates, which in turn allow noise in the second derivative to trigger assertions of an STV signal 220b or an RTV signal 222b. If shot noise is the dominant noise source, these noise triggered assertions occur more frequently during the light, or space, portions of the input signal 210b. For this reason, coupled with the fact that transitions in the signal processor output 218b only occur for the first assertion of an STV signal 220b or an RTV signal 222b, light-to-dark transitions are particularly susceptible to early triggering by noise in the input signal 210b. The effect of early triggering of light-to-dark transitions is to broaden the measured bar width at the expense of the preceding space. In addition, since no peaks in the first derivative signal 212b will have been detected yet, the threshold signals 216b are typically low during detection of the first space in the barcode. The first light-to-dark transition in the input signal 210b is therefore especially susceptible to early triggering, yielding a first space which is too narrow and a first bar which is too wide.

Figure 4:
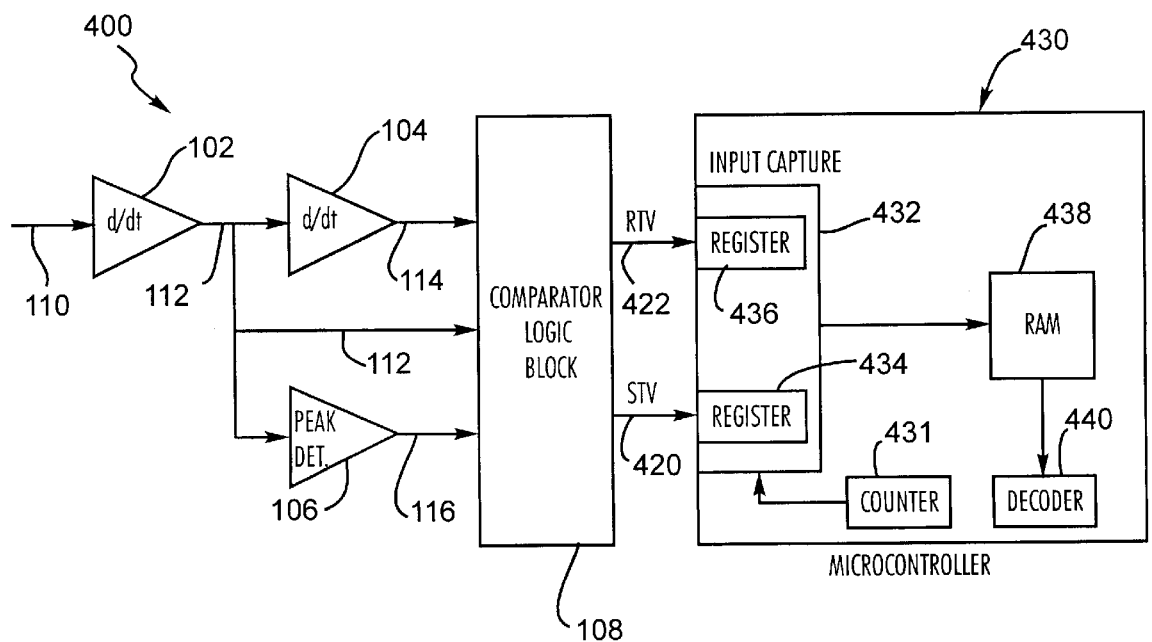

A preferred embodiment of a second derivative signal processor 400 is shown in FIG. 4; associated waveforms are illustrated in FIG. 3. The signal processor 400 comprises: a first differentiator 102; a second differentiator 104; a peak detector 106; a comparator logic block 108; and a microcontroller 430. The microcontroller comprises: an input capture system 432, including an STV register 434, receiving STV signals 220 from comparator logic block output lines 420, and an RTV register 436, receiving RTV signals 222 from comparator logic block output lines 422; a counter 431; and random access memory (RAM) 438. The microcontroller 430 may be implemented as a separate component or may also comprise a decoder 440. Up to the point where the STV signals 220 and the RTV signals 222 are produced, the signal processor 400 operates in a manner completely analogous to that of the second derivative signal processor 100 (described above and with reference to FIGS. 1 and 2).

With reference to FIGS. 3 and 4, the STV signal 220b and the RTV signal 222b are presented to the input capture system 432 within the microcontroller 430. The input capture system 432 is coupled to a free running counter 431, which is used by the input capture system 432 as a time base. Each assertion of an STV signal 220b or an RTV signal 222b causes the current counter value to be stored in the STV register 434 or the RTV register 436, respectively. The input capture system 432 operates as follows. Upon a first assertion of an RTV signal 222b, the value of the RTV register 436 is stored in RAM 438. Subsequent assertions of RTV signals 222b are ignored until after a subsequent assertion of an STV signal 220b. Each successive assertion of an STV signal 220b without an intervening assertion of an RTV signal 222b causes the contents of the STV register 434 to be updated with a new counter value. Upon a new assertion of an RTV signal 222b, the contents of the STV register 434 are stored in RAM 438 and used with the preceding stored RTV value to determine a space width. The current counter value in the RTV register 436 is stored in RAM 438 and used with the STV value to determine a bar width. The entire sequence is repeated until the complete sequence of light and dark regions of the input signal 210b have been processed to yield a sequence of space and bar widths.

When shot noise is the dominant source of noise in the input signal 210b, noise peaks in the derivative signals will be larger during the light portions of the input signal 210b. Therefore the last assertion of an STV signal 220b is more likely to be the correct one to determine the timing of a light-to-dark transition in the output signal 218b, while the first assertion of an RTV signal 222b is more likely to be the correct one to determine the timing of a dark-to-light transition in the output signal 218b. The embodiment described hereinabove provides a desirable construction for a second derivative signal processor 400 wherein light-to-dark transitions are triggered by the last assertion of the STV signal 220b during the assertion of a comparator gate, while dark-to-light transitions are triggered by the first assertion of an RTV signal 222 during the assertion of a comparator gate (i.e., "last STV, first RTV").

FIG. 3 provides a comparison of an exemplary output signal waveform 218b resulting from the signal processing system 100, an exemplary output signal waveform 218c resulting from a preferred signal processing system 400, and an output waveform representation of the actual barcode scanned 319. As may be seen, the output signal 218c in accordance with the embodiment herein more accurately approximates the correct representation of the actual barcode scanned 319.

The preferred embodiment disclosed in the preceding paragraphs utilizes a combination of hardware (input capture circuit and counter) and software (storage and calculation functions performed by the microcontroller 430). Without departing from inventive concepts disclosed herein, alternative embodiments for performing "last STV, first RTV" edge detection may be employed. Such alternative embodiments may include, but are not limited to, embodiments in which all functions are performed by hardware (such as one or more ASICs, or a multiplicity of discrete logic units) and embodiments in which all functions are performed by software and the STV signals and RTV signals serve as inputs for a microcontroller. In addition to second derivative signal processors, any signal processing method and/or apparatus which produces the functional equivalent of STV and RTV signals (including but not limited to delay line signal processors) may employ edge detection methods and apparatus according to the present invention without departing from inventive concepts disclosed herein.

The present invention has been set forth in the form of its preferred embodiments. It is nevertheless intended that modifications to the disclosed signal processing and edge detection methods may be made by those skilled in the art without departing from the scope and spirit of the inventive concepts set forth herein and defined in the appended claims.

What is claimed is:

1. In a barcode scanner system, a method of determining relative bar and space widths in a scanned input signal comprising the steps of:

identifying a first dark-to-light transition in the input signal;

storing a value representing said identified first dark-to-light transition;

consecutively identifying at least one light-to-dark transition in the input signal;

consecutively storing a value representing each said consecutively identified light-to-dark transition;

identifying a second dark-to-light transition in the input signal;

storing a value representing said identified second dark-to-light transition; and, determining relative space and bar widths in the input signal by comparing said stored value representing said identified second dark-to-light transition with the last said consecutively stored value to determine the previous bar width and comparing the last said consecutively stored value with said stored value representing said identified first dark-to-light transition to determine the previous space width.

2. The method of claim 1 wherein the relative widths of each subsequent series of bars and spaces are determined by repeating the steps of claim 1 using said identified second dark-to-light transition of the previous series of bars and spaces as said first dark-to-light transition.

3. The method of claim 1 further comprising the steps of:

consecutively identifying at least one light-to-dark transition in the input signal occurring prior to identifying said first dark-to-light transition;

storing a value representing a last consecutively identified light-to-dark transition in the input signal occurring prior to identifying said first dark-to-light transition; and, comparing said stored value representing said identified first dark-to-light transition with said stored value representing said last consecutively identified light-to-dark transition in the input signal occurring prior to identifying said first dark-to-light transition to determine the relative width of the first bar of the input signal.

4. The method of claim 1 wherein the identifying steps utilize second derivative signal processing methods.

5. The method of claim 1 wherein the storing and consecutively storing steps utilize an input capture system.

6. The method of claim 1 wherein the values stored are time values.

7. The method of claim 1 wherein the step of consecutively storing further comprises updating each previous consecutively stored value.

8. In a barcode scanner system, a second derivative signal processing method for determining relative widths of bars and spaces in an input signal comprising the steps of:

(a) generating a first RTV signal corresponding to a first dark-to-light transition as determined from a second derivative zero crossing with respect to the input signal;

(b) generating successive STV signals corresponding to light-to-dark transitions as determined from second derivative zero crossings with respect to the input signal;

(c) generating a second RTV signal corresponding to a dark-to-light transition as determined from a second derivative zero crossing with respect to the input signal and occurring after the generation of at least one STV signal in step (b);

(d) determining relative bar and space widths in the input signal using the last STV signal generated and the first RTV signal generated to determine space width and the last STV signal generated and the second RTV signal generated to determine bar width; and, (e) repeating steps (a) to (d) until the entire input signal has been processed.

9. The method of claim 8 wherein step (a) further comprises determining the width of a first bar in the input signal using the first RTV signal corresponding to a first dark-to-light transition.

10. The method of claim 8 wherein step (a) further comprises generating additional RTV signals subsequent to said first RTV signal and ignoring said additional RTV signals generated until at least one STV signal is generated in step (b).

11. The method of claim 8 wherein steps (a), (b), and (c) further comprise storing a time value corresponding to the relative time of generation of respective RTV and STV signals and wherein step (d) uses the respective stored time values to effect the determination of the relative bar and space widths.

12. In a barcode scanner system utilizing second derivative signal processing to identify dark-to-light transitions and light-to-dark transitions in an input signal and wherein a first signal is asserted corresponding to detection of a dark-to-light transition and a second signal is asserted corresponding to a light-to-dark transition, a method for determining relative space and bar widths in an input signal comprising the steps of:

(a) identifying and storing a time value in relation to a first assertion of the first signal;

(b) ignoring subsequent assertions of the first signal until after at least one assertion of the second signal;

(c) identifying and storing a time value in relation to a first assertion of the second signal;

(d) identifying a time value in relation to at least one subsequent assertion of the second signal;

(e) updating the time value stored in step (c) with the new time value identified in step (d) for each subsequent assertion of the second signal;

(f) repeating steps (d) and (e) for each subsequent assertion of the second signal until a second assertion of the first signal;

(g) identifying and storing a time value in relation to the second assertion of the first signal; and, (h) determining relative bar and space widths in the input signal using the time value stored in step (a) and the last updated time value in steps (d), (e), and (f) to determine space width and using the last updated time value in steps (d), (e), and (f) and the time value stored in step (g).

13. The method of claim 12 further comprising the step of maintaining the time value stored in step (g) as the new time value for step (a) and repeating steps (b) through (h).

14. In a barcode scanner system, a system for determining the relative widths of bars and spaces from an input signal representing a scanned barcode label comprising:

means for detecting dark-to-light transitions in the input signal;

means for asserting an RTV signal in relation to the detection of a dark-to-light transition in the input signal;

first input capture means for storing a value representing said assertion of an RTV signal, said first input capture means storing a first value representing an assertion of an RTV signal in relation to the detection of a first dark-to-light transition in the input signal and a second value in relation to the detection of a second dark-to-light transition in the input signal;

means for consecutively detecting at least one light-to-dark transition in the input signal after the detection of the first dark-to-light transition in the input signal and before the detection of the second dark-to-light transition in the input signal;

means for asserting an STV signal in relation to each consecutively detected light-to-dark transition in the input signal;

second input capture means for storing a value representing each said consecutive assertion of an STV signal;

means for determining the relative widths of bars and spaces in the input signal by comparing the second value in relation to the detection of a second dark-to-light transition with the last stored value representing the consecutive assertion of an STV signal to determine the previous bar width and comparing the last stored value representing the consecutive assertion of an STV signal with the first value in relation to the detection of a first dark-to-light transition to determine the previous space width.

15. The system of claim 14 wherein said means for detecting, said means for asserting an RTV signal, said means for consecutively detecting, and said means for asserting an STV signal collectively comprise second derivative signal processing circuitry.

16. The system of claim 14 wherein said first input capture means further comprises an RTV register and said second input capture means further comprises an STV register, said RTV register and said STV register being coupled to a Random Access Memory.

17. The system of claim 16 further comprising a counter for use as a time base and wherein said RTV register, said STV register, said Random Access Memory and said counter are incorporated into a microcontroller.

* * * * *